(12) United States Patent
Baumecker et al.

(10) Patent No.: US 10,990,272 B2
(45) Date of Patent: Apr. 27, 2021

(54) DISPLAY A SUBSET OF OBJECTS ON A USER INTERFACE

(71) Applicant: MICRO FOCUS LLC, Santa Clara, CA (US)

(72) Inventors: Klaus Baumecker, Boeblingen (DE); Stefan Bergstein, Boeblingen (DE); Timo Schneller, Boeblingen (DE)

(73) Assignee: Micro Focus LLC, Santa Clara, CA (US)

( * ) Notice: Subject to any disclaimer, the term of this patent is extended or adjusted under 35 U.S.C. 154(b) by 130 days.

(21) Appl. No.: 15/534,233

(22) PCT Filed: Dec. 16, 2014

(86) PCT No.: PCT/US2014/070608
§ 371 (c)(1),
(2) Date: Jun. 8, 2017

(87) PCT Pub. No.: WO2016/099460
PCT Pub. Date: Jun. 23, 2016

(65) Prior Publication Data
US 2017/0371534 A1    Dec. 28, 2017

(51) Int. Cl.
*G06F 3/0488* (2013.01)
*G06F 16/78* (2019.01)
*G06F 3/0482* (2013.01)
*G06K 9/00* (2006.01)

(52) U.S. Cl.
CPC ........ *G06F 3/04883* (2013.01); *G06F 3/0482* (2013.01); *G06F 16/7867* (2019.01); *G06K 9/00355* (2013.01)

(58) Field of Classification Search
CPC ............. G06F 3/04883; G06F 16/7867; G06F 3/0482; G06K 9/00355
See application file for complete search history.

(56) References Cited

U.S. PATENT DOCUMENTS

| | | | |
|---|---|---|---|
| 6,184,886 B1 * | 2/2001 | Bates | ................. G06F 16/9562 715/760 |
| 8,553,981 B2 | 10/2013 | Mei et al. | |
| 8,724,963 B2 | 5/2014 | Bliss et al. | |
| 2002/0122073 A1 * | 9/2002 | Abrams | ................ H04N 7/181 715/838 |

(Continued)

FOREIGN PATENT DOCUMENTS

| | | |
|---|---|---|
| WO | WO-2012058718 | 5/2012 |
| WO | WO-2014042967 A1 | 3/2014 |

OTHER PUBLICATIONS

Jiang, et al. GestureQuery: A Multitouch Database Query Interface. Computer Science & Engineering Ohio State University. http://www.vldb.org/pvldb/vol6/p1342-nandi.pdf.

(Continued)

*Primary Examiner* — Mandrita Brahmachari (57) ABSTRACT

In one implementation, a method for causing display of a subset of objects of a data set can including causing a first visual indication to display at a first area of a user interface that a first object is a focal object, causing a second area of the user interface to display a filter applied to the data set, and causing a third area of the user interface to display a subset of objects of the data set based on the focal object and the filter.

19 Claims, 6 Drawing Sheets

(56) References Cited

U.S. PATENT DOCUMENTS

| | | | |
|---|---|---|---|
| 2004/0059719 A1* | 3/2004 | Gupta | H04L 61/1523 |
| 2007/0220444 A1 | 9/2007 | Sunday et al. | |
| 2007/0300172 A1 | 12/2007 | Runge | |
| 2008/0229245 A1 | 9/2008 | Ulerich et al. | |
| 2008/0263450 A1* | 10/2008 | Hodges | G11B 27/034 |
| | | | 715/723 |
| 2009/0327963 A1* | 12/2009 | Mouilleseaux | G06F 3/0482 |
| | | | 715/834 |
| 2011/0209088 A1* | 8/2011 | Hinckley | G06F 3/0488 |
| | | | 715/810 |
| 2012/0109986 A1 | 5/2012 | Palermiti, II | |
| 2012/0221567 A1 | 8/2012 | Finkelstein et al. | |
| 2012/0278762 A1* | 11/2012 | Mouilleseaux | G06F 3/0482 |
| | | | 715/834 |
| 2013/0019175 A1* | 1/2013 | Kotler | G06F 3/0482 |
| | | | 715/728 |
| 2013/0086522 A1* | 4/2013 | Shimazu | G06F 3/0488 |
| | | | 715/810 |
| 2013/0104079 A1* | 4/2013 | Yasui | G06F 3/0482 |
| | | | 715/834 |
| 2013/0151666 A1 | 6/2013 | Hunter | |
| 2013/0166550 A1 | 6/2013 | Buchmann et al. | |
| 2013/0346405 A1 | 12/2013 | Davis | |
| 2014/0075393 A1 | 3/2014 | Mei et al. | |
| 2014/0089819 A1* | 3/2014 | Andler | G06Q 50/01 |
| | | | 715/753 |
| 2014/0189559 A1* | 7/2014 | Bleizeffer | G06F 17/30265 |
| | | | 715/769 |
| 2014/0189587 A1* | 7/2014 | Nam | H04N 21/44222 |
| | | | 715/810 |
| 2014/0195513 A1 | 7/2014 | Raichelgauz et al. | |
| 2014/0278556 A1* | 9/2014 | Goltra | G06Q 50/24 |
| | | | 705/3 |

OTHER PUBLICATIONS

Lee, Jenn K., Review: iriver X20, Apr. 8, 2007, 20 pages http://www.pocketables.com/2007/04/review_iriver_x.html.

Unknown, First Else Smartphone Promises More Intuitive Ui in Q2 2010, Dec. 15, 2009, 43 pages http://sigalonmobile.soup.io/tag/wifi?since=38040581.

Unknown, the Camera, last updated Feb. 7, 2013, 21 pages http://www.androidpolice.com/2013/02/04/stock-android-isnt-perfect-jelly-bean-4-2-edition/.

International Searching Authority, International Search Report and Written Opinion in PCT/US2014/070616, dated Jun. 30, 2015, 12 pages total.

Jiang, et al., "GestureQuery: A Multitouch Database Query Interface," Computer Science & Engineering Ohio State University, 2013, 4 pages total.

* cited by examiner

DISPLAY A SUBSET OF OBJECTS ON A USER INTERFACE

BACKGROUND

Data is ubiquitous. Data creation, storage, and analysis are common operations in information technology ("IT") industry and solutions for facilitating those operations are commonly developed for industry-specific or problem-specific purposes. For example, a database of IT service tickets can be maintained to discover common bugs in a system or a log of security alerts can be searched and/or analyzed to discover a system breach. Often, IT monitoring tools rely on strictly typed models that are populated with many details. One form of data consumption is through data exploration and/or navigation. For example, data sets may be presented in tabular form or aggregated as charts.

DETAILED DESCRIPTION

Introduction:

In the following description and figures, some example implementations of data exploration systems and/or methods for causing display of a subset of objects of a data set are described. Solutions to data exploration are commonly dictated by the particular problem and industry desires. For example, a data management paradigm of the IT industry has shifted from "management by exception" to "collect everything and analyze on demand." Searching and browsing through large data sets can be ineffective due to the size of the data set and navigational functionality. The goal of assisting users to detect, identify, and resolve availably and performance issues of applications and IT infrastructures is constrained by user interface ("UI") workflows and unwanted data constraints.

Various examples described below relate to causing display of a subset of objects of a data set based on tagged associations of the data objects. By utilizing tags, data objects can be loaded for view and explored using gestures to find data objects associated with a designated focal object (i.e., an object designated as the focus of exploration). Gestures can allow for a user to observe a window of associated data objects and change the presented data by using a filter of tags and/or changing the focal object. In this manner, a user can effectively traverse large data sets in an intuitive and flexible form.

The following description is broken into sections. The first, labeled "Components," describes examples of physical and logical components for implementing various embodiments. The second, labeled "Environment," describes an example of a network environment in which various embodiments may be implemented. The third section, labeled "Operation," describes steps taken to implement various embodiments.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, manage, and/or modify."

Figure 1:
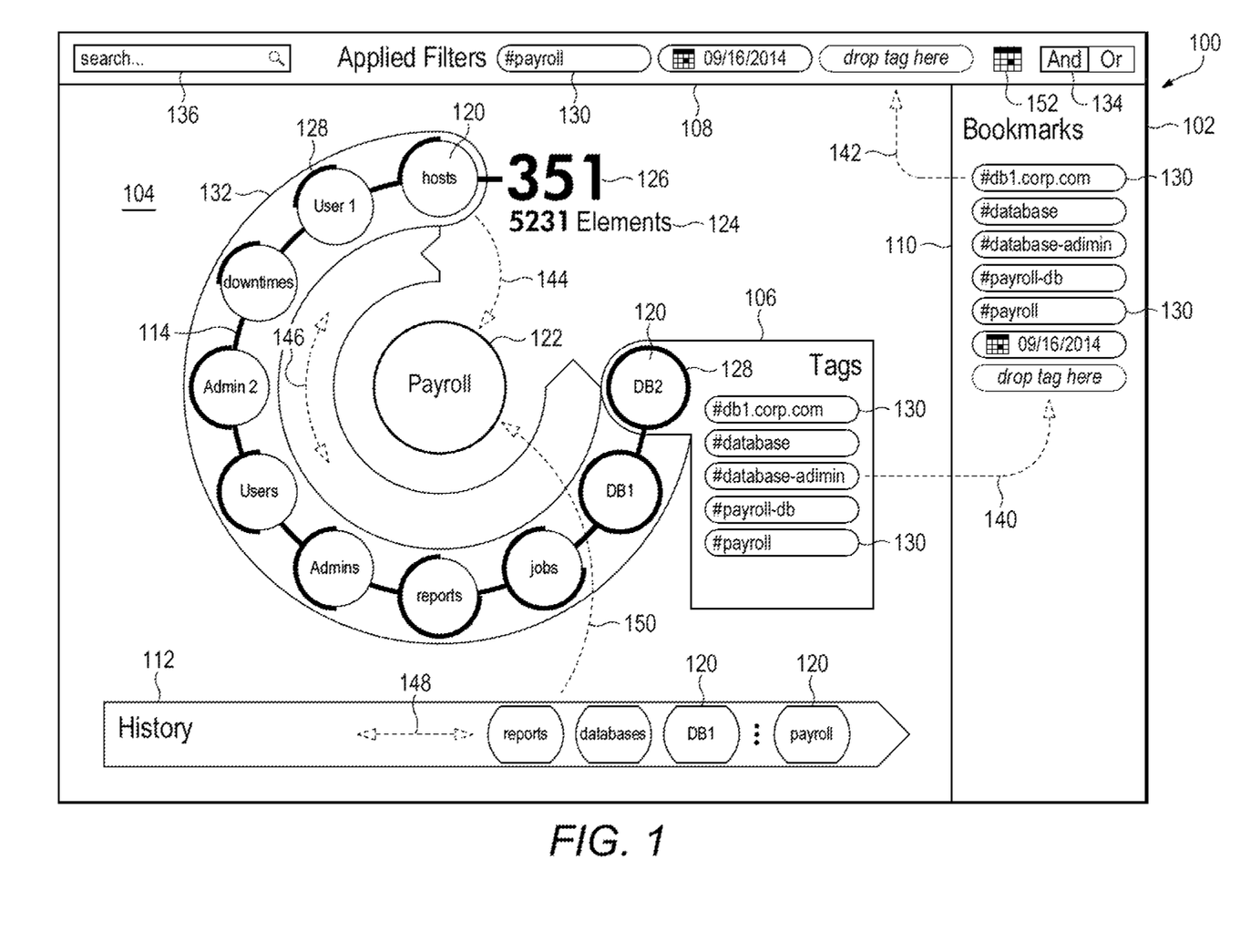
FIG. 1 depicts an example user interface ("UI") in which various data exploration systems can be implemented.

Components:

FIG. 1 depicts an example UI 102 in which various data exploration systems 100 can be implemented. The example UI 102 is a graphical UI that provides visual representations of functionalities to allow a user to explore a large data set with the ease of changing what part of the data set is being observed at any given time using gestures.

The example UI 102 of FIG. 1 is organized into five main areas. The first area 104 (the area of the UI 102 for traversing the data set) displays a portion of a data set as objects 120 where one object is the focal object associated with the displayed objects (as designated at the focal object location 122). The first area 104 can include an indication of the total number 124 of elements associated with the focal object and an indication of the position 126 of the objects currently visible in the first area 104. The objects 120 can be moved within the window 132 to show more elements of the results that are hidden from view as indicated by the total number 124 and the position 126, such as by using a clockwise or counterclockwise gesture 146. In some examples, the outline of the window 132 may not be visible. In some examples, the objects 120 that are associated with the focal object at location 122 can follow a reference arc 114 (which may or may not be visible). The reference arc 114 represents an expected path and/or positions of the objects 120 being made visible at any given time. Limiting the visibility of the data set aids the user in consuming the information of the data set as well as the ability to move objects 120 in and out of the window 132.

Each object 120 is associated with at least one tag 130. For example, the object detail area 106 displays the tags 130 associated with one of the objects 120. The tags 130 can be used to determine the results shown in the window 132. In particular, tags 130 can be added to a filter on the objects 120 associated with the focal object. For example, a user can select the calendar icon 152 to create a tag associated with a time period to filter the objects in the window to objects that have been updated during the specified time period. The applied filters area 108 displays the tags 130 of the filter. The tags 130 of the filter can be joined to narrow or broaden the results based on the toggle 134. Tags 130 that are used often, or otherwise may want to be remembered, can be saved into the bookmark area 110 that displays a list of saved tags. For example, a user can use the gesture 140 to move a tag 130 of an object from the object detail area 106 to the bookmark area 110. When the tag 130 of the object 120 is desired to be used in the filter, the tag 130 can be dragged directly from the object details area 106 or from the bookmark area 110 to the applied filters area 108 (e.g., using gesture 142). The indicator 128 associated with each visible object 120 can indicate how well the object 120 matches the filter.

The focal object can be searched for in the data set based on initialization parameters from the system 100, using the search box 136, or by pulling an object 120 from the window 132 to the focal object location 122 (e.g., using the gesture 144). A history of which objects 120 have been in the focal object location 122 are displayed in the history area 112. The history of the focal objects can be traversed (such as by using gesture 148) and a former focal object can be returned to the focal object location 122 by using a gesture 150 to select a former focal object 120 and dragging the former focal object 120 to the focal object location 122. The above collection of functionalities offered by the UI can provide flexible ability to traverse large data sets in a manner intuitive to the user.

Figure 2:
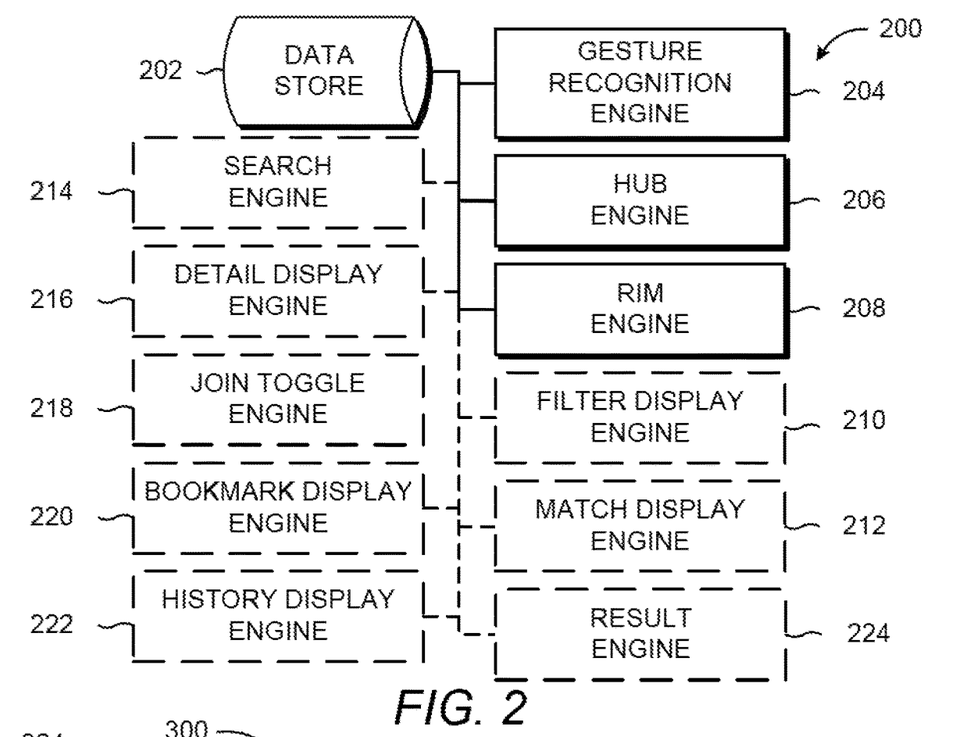
FIGS. 2 and 3 are block diagrams depicting example data exploration systems.
Figure 3:
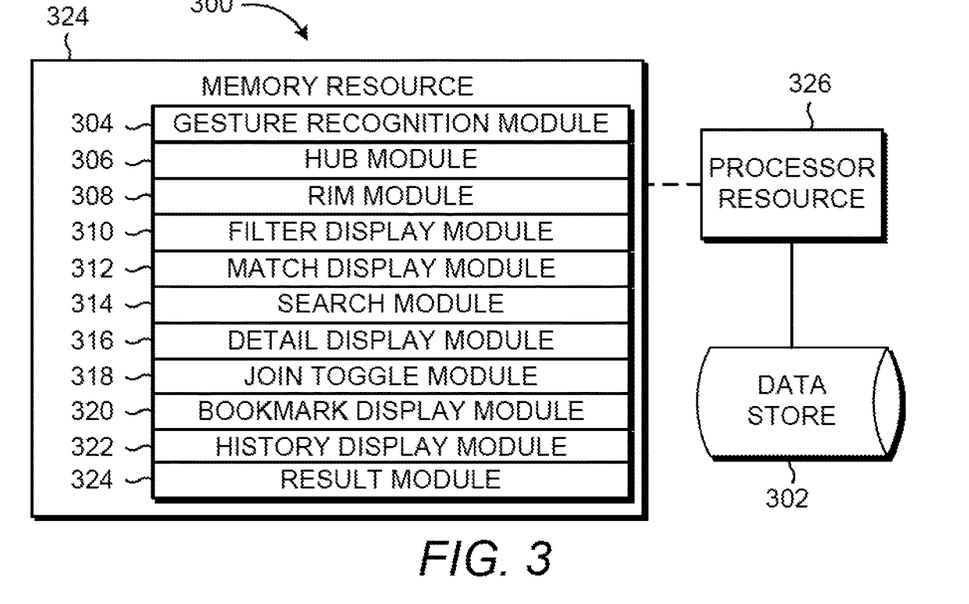

FIGS. 2 and 3 are block diagrams depicting example data exploration systems 200 and 300. Referring to FIG. 2, the example system 200 of FIG. 2 generally includes a data store 202, a gesture recognition engine 204, a hub engine 206, a rim engine 208. In general, the rim engine 208 is to cause display of a subset of objects that are related to the focal object (maintained by the hub engine 206) based on gestures identified by the gesture recognition engine 204. The example system 200 can include a filter display engine 210, a match display engine 212, a search engine 214, a detail display engine 216, a join toggle engine 218, a bookmark display engine 220, a history display engine 222, and a result engine 224. In general, the engines 204-224 can facilitate exploration of a data set comprising objects capable of being tagged to represent associations with other objects of the data set.

The system 200 is useful to explore large data set and can be applied to large data sets that are semi-structured. For example, the partial structure of a data set can be a label associated with an attribute of the object or a pointer reference from one object to another. The partial structure of the data set is represented as tags that are coupled to objects of the data set. The tags represent associations of the data set. For example, the associations can be relationships, commonalities, attributes, designations, etc. that are able to be represented by tags. The tags are to be coupled with objects. For example, each object of a particular type can be tagged with a tag associated with designating the object type and each object created at a particular time may have a creation time-stamp tag that represents the date of creation of the object. Tags may be represented in any appropriate form such as a number, a value, a character, a string, a category, an icon, an image, or other identifier.

Referring to FIG. 2, the gesture recognition engine 204 represents any circuitry or combination of circuitry and executable instructions to identify gestures performed on a UI. A gesture can be identified based on the location of input and action represented by the input. For example, the location of the input can be an area of the UI and an action can be a double-click on the area. Such input can be provided from a touch screen or a peripheral device, such as a computer mouse or motion detection system.

Gestures can include any appropriate form of interaction with a UI. For example, a gesture can be a drag-and-drop gesture to move an element of the UI to a different location, a double-tap gesture to select an element of the UI, a click-and-hold gesture to select an element of the UI, a rotational gesture to move an element of the UI in a circular direction or make a selection from a list, etc. For another example, a gesture along the path of the reference arc (e.g., reference arc 114 of FIG. 1) can change the subset of objects displayed in the results window (e.g., move objects in from one side or the other until an end of the results is reached). Gestures can represent selection of a UI element, movement within a list, movement from one location to another, modification of an attribute, or other capabilities associated with data exploration.

The hub engine 206 represents any circuitry or combination of circuitry and executable instructions to cause display of a focal object as a hub of a reference arc. The focal object is an object of the data set to which the exploration is directed at a given time. The hub represents a location of the focal object. For example, the hub can be a designated place on the UI based on where the objects related to the focal object are displayed. The hub can be related to a reference arc, such as reference arc 114 of FIG. 1. For example, the reference arc may be part of a circumference of a circle having an origin (i.e., the center of the circle), where the hub can be located at the center of the circle. The reference arc can be any curved line, such as part of a circumference of a circle or part of the perimeter of an oval. In the example of an ellipse (e.g., oval), the hub can be placed near one of a plurality of focus points (e.g., within a range between the two points that define the ellipse.)

The focal object can be designated based on a gesture. For example, the hub engine 206 can cause a focal object to display as a hub based on a first gesture on a first object and change the focal object to a second object when a second gesture is performed on the second object. The hub engine 206 can load the focal object based on a gesture that represents movement of an object to a focal object location designated as a visual location of the hub. For example, as discussed above, gestures can include dragging an object to the focal object location or double-tapping the object to be appointed as the focal object.

The rim engine 208 represents any circuitry or combination of circuitry and executable instructions to cause display of a window related to the hub loaded with a subset of the objects associated with the focal object. The window can be a curved area of the UI used to display a subset of objects associated with the focal object. For example, the window can form part of or be aligned with the reference arc and the rim engine 208 can cause a curved UI area (i.e., the window) to display a subset of objects associated with the focal object located at the hub (e.g., the focus point or center of the reference arc). The curvature of the window intuitively assists the user to "spin" or "slide" the data of the window to view more results associated with the focal object.

The rim engine 208 can load a second subset of the objects based on a gesture that represents a change of data within the window. For example, a counterclockwise gesture following the reference arc can provide further results and hide a previously shown result. For another example, a clockwise gesture following the reference arc can move the subset of visible objects towards the beginning of the loaded results. In this manner, the window and focal object location can act as wheel of data results, where the rim can be turned to discover more related data objects and the hub can be changed out to create a different set of result objects on the rim. The objects can move along a path designated by the reference arc. One can imagine invisible spokes from the focal object at the hub to the objects on the rim representing the tag relationship between the focal object and the objects in the window. The wheel-like UI can assist the user to consume the data set in comfortable portions.

The filter display engine 210 represents any circuitry or combination of circuitry and executable instructions to cause display of a plurality of tags being used to filter the results in the window. For example, the filter display engine 208 can display a first tag for filtering the objects designated to load in the window. Each tag can determine the size of the results being displayed. For example, a tag can narrow the objects available to load into the window from the data set based on a relationship with the tag.

The join toggle engine 218 represents any circuitry or combination of circuitry and executable instructions to identify whether the filter comprises one of a union and an intersection of a first tag and a second tag. For example, the group of objects associated with the first tag can be combined with the group of objects associated with the second tag to form a union. For another example, the group of objects associated with first tag and not associated with the second tag can be removed from the results to form an intersection.

The match display engine 212 represents any circuitry or combination of circuitry and executable instructions to cause display of a visual indicator of a degree of conformity of each of the subset of objects displayed in the window. For example, the filter may contain ten tags and objects associated with the same ten tags can have a visual indication that indicates an exact match is found while objects that are associated with less than ten tags can be associated with a visual indication that indicates a partial match. The visual indicator can be any appropriate form of visual representation, such as a value, a text, a color, a font, a line width, a shadow, an icon, an image, or any other visually distinctive characteristic. The visual indicator can be one of a range of visual indicators that can denote a degree of conformity of an object to the filter. A degree of conformity can represent the closeness of the associations with an object to the associations represented by the tags of the filter.

The search engine 214 represents any circuitry or combination of circuitry and executable instructions to specify an initial association to limit the data set to display in the window based on a text input. For example, a user may have received an error that suggests a data object (or class of data objects) that may be the source of the error and the user can enter the guess into the search box to bring up the data object that matches the text of the search box. In that example, the discovered object can be automatically designated as the focal object or manually designated as the focal object based on a selection of an object from a list of search results.

The detail display engine 216 represents any circuitry or combination of circuitry and executable instructions to cause display of the details of an object on the UI when the object resides in a first location of the UI associated with the reference arc. For example, a particular position within the window may be designated as the position to show details of the object. In that example, details of objects may be shown as the window spins and various objects reach the designated position. For another example, the details of an object may be made visible based on a gesture, such as a double-tap or a tap-and-hold gesture.

The bookmark display engine 220 represents any circuitry or combination of circuitry and executable instructions to receive a tag based on a gesture and store in a location on the UI away from the reference arc. The bookmark display engine 220 can maintain a presentation of a list of tags so that each tag of the list of tags is readily available to be added to the filter.

The history display engine 222 represents any circuitry or combination of circuitry and executable instructions to cause display of a log of objects that have been designated as the focal object. The history display engine 222 can maintain a presentation of a list of objects that have been appointed as the focal object so that the list of former focal objects is readily available to be made the focal object again. The history can be listed in a manner appropriate for data exploration. For example, the list of objects can be displayed in the order of the most recently appointed focal object to the least recently appointed focal object.

The result engine 224 represents any circuitry or combination of circuitry and executable instructions to cause display of a total number of results and a position of the displayed results in the total number of results. For example, the result engine 224 can include a result size engine and a result position engine where the result size engine represents a combination of circuitry and executable instructions to cause a number of the objects of the data set available to be presented on the UI and the result position engine represents a combination of circuitry and executable instructions to cause display, on the UI, of a number associated with a position of the subset in the resulting set of objects available for loading into the window.

The data store 202 can contain information utilized by the engines 204-224. For example, the data store 202 can store the data set, a tag, a filter, a graph, a log of the history of the focal objects, gesture information, etc.

FIG. 3 depicts the example system 300 can comprise a memory resource 330 operatively coupled to a processor resource 328. The processor resource 328 can be operatively coupled to a data store 302. The data store 302 can be the same as the data store 202 of FIG. 2.

Referring to FIG. 3, the memory resource 330 can contain a set of instructions that are executable by the processor resource 328. The set of instructions are operable to cause the processor resource 328 to perform operations of the system 300 when the set of instructions are executed by the processor resource 328. The set of instructions stored on the memory resource 330 can be represented as a gesture module 304, an hub module 306, a rim module 308, a filter display module 310, a match display module 312, a search module 314, a detail display module 316, a join toggle module 318, a bookmark display module 320, a history display module 322, and a result module 324. The modules 304-324 represent program instructions that, when executed, function as the gesture recognition engine 204, the hub engine 206, the rim engine 208, the filter display engine 210, the match display engine 212, the search engine 214, the detail display engine 216, the join toggle engine 218, the bookmark display engine 220, the history display engine 222, and the result engine 224 of FIG. 2, respectively. The processor resource 328 can carry out a set of instructions to execute the modules 304-324, and/or any other appropriate operations among and/or associated with the modules of the system 300. For example, the processor resource 328 can carry out a set of instructions to provide a user interface that, when interacted with using a gesture recognition engine, causes the processor resource to cause a focal object to display as a hub based on a first gesture on an object and cause a curved UI area to display a subset of objects based on the focal object, a filter applied to the data set related to the focal object, and a position of the subset of objects in the set of objects as a result of the filtering. For another example, the processor resource 328 can carry out a set of instructions to cause tags of the filter to display on the UI, cause a visual indicator to display with reference to a first object to indicate a degree of conformity of the first object to the filter, cause a history of objects that have been designated as the focal object to display on the UI, cause details of one of the subset objects to display in a detail UI area (associated with a position within the curved UI area), cause a tag to display in a bookmark UI area, cause a number of objects that result from applying the filter on the data set to display on the UI, and cause a position of the number of objects of the subset of objects to display on the UI. For yet another example, the processor resource 328 can carry out a set of instructions to update the UI based on gestures, such as carry out a set of instructions to cause a tag from the bookmark UI area to be added to the filter based on a gesture on the tag and cause the subset of objects to change based on a rotational gestured associated with the curved UI area.

Figure 5:
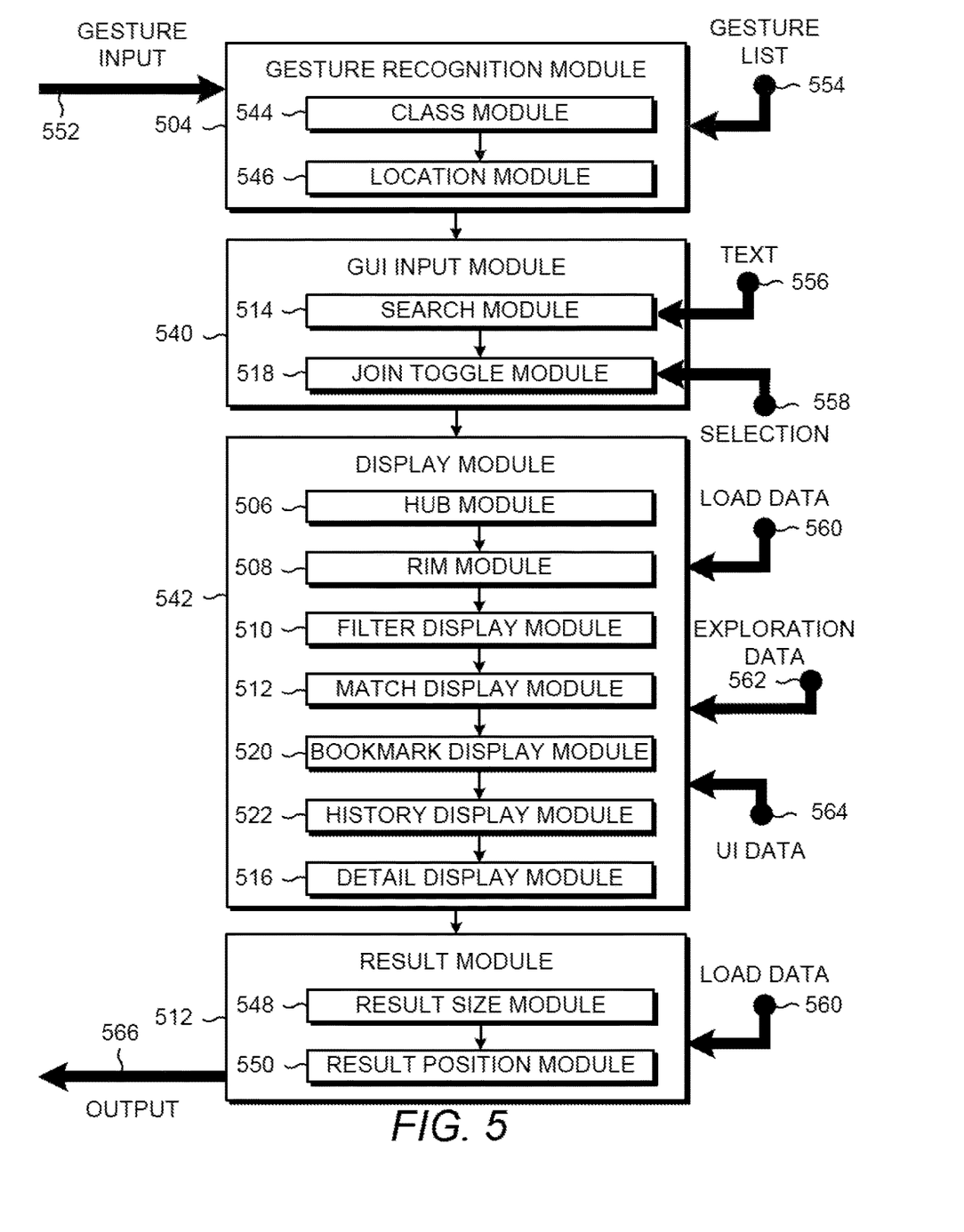
FIG. 5 depicts example modules used to implement example data exploration systems.

Although these particular modules and various other modules are illustrated and discussed in relation to FIG. 3 and other example implementations, other combinations or sub-combinations of modules can be included within other implementations. Said differently, although the modules illustrated in FIG. 3 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 5 depicts yet another example of how functionality can be organized into modules.

The processor resource 328 can be any appropriate circuitry capable of processing (e.g., computing) instructions, such as one or multiple processing elements capable of retrieving instructions from the memory resource 330 and executing those instructions. For example, the processor resource 328 can be a central processing unit ("CPU") that enables data exploration by fetching, decoding, and executing modules 304-324. Example processor resources 328 include at least one CPU, a semiconductor-based microprocessor, an application specific integrated circuit ("ASIC"), a field-programmable gate array ("FPGA"), and the like. The processor resource 328 can include multiple processing elements that are integrated in a single device or distributed across devices. The processor resource 328 can process the instructions serially, concurrently, or in partial concurrence.

The memory resource 330 and the data store 302 represent a medium to store data utilized and/or produced by the system 300. The medium can be any non-transitory medium or combination of non-transitory mediums able to electronically store data, such as modules of the system 300 and/or data used by the system 300. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 330 can be said to store program instructions that when executed by the processor resource 328 cause the processor resource 328 to implement functionality of the system 300 of FIG. 3. The memory resource 330 can be integrated in the same device as the processor resource 328 or it can be separate but accessible to that device and the processor resource 328. The memory resource 330 can be distributed across devices. The memory resource 330 and the data store 302 can represent the same physical medium or separate physical mediums. The data of the data store 302 can include representations of data and/or information mentioned herein.

In the discussion herein, the engines 204-224 of FIG. 2 and the modules 304-324 of FIG. 3 have been described as circuitry or a combination of circuitry and executable instructions. Such components can be implemented in a number of fashions. Looking at FIG. 3, the executable instructions can be processor-executable instructions, such as program instructions, stored on the memory resource 330, which is a tangible, non-transitory computer-readable storage medium, and the circuitry can be electronic circuitry, such as processor resource 328, for executing those instructions. The instructions residing on the memory resource 330 can comprise any set of instructions to be executed directly (such as machine code) or indirectly (such as a script) by the processor resource 328.

In some examples, the system 300 can include the executable instructions can be part of an installation package that when installed can be executed by the processor resource 328 to perform operations of the system 300, such as methods described with regards to FIGS. 5-8. In that example, the memory resource 330 can be a portable medium such as a compact disc, a digital video disc, a flash drive, or memory maintained by a computer device, such as a service device 434 of FIG. 4, from which the installation package can be downloaded and installed. In another example, the executable instructions can be part of an application or applications already installed. The memory resource 330 can be a non-volatile memory resource such as read only memory ("ROM"), a volatile memory resource such as random access memory ("RAM"), a storage device, or a combination thereof. Example forms of a memory resource 330 include static RAM ("SRAM"), dynamic RAM ("DRAM"), electrically erasable programmable ROM ("EEPROM"), flash memory, or the like. The memory resource 330 can include integrated memory such as a hard drive ("HD"), a solid state drive ("SSD"), or an optical drive.

Figure 4:
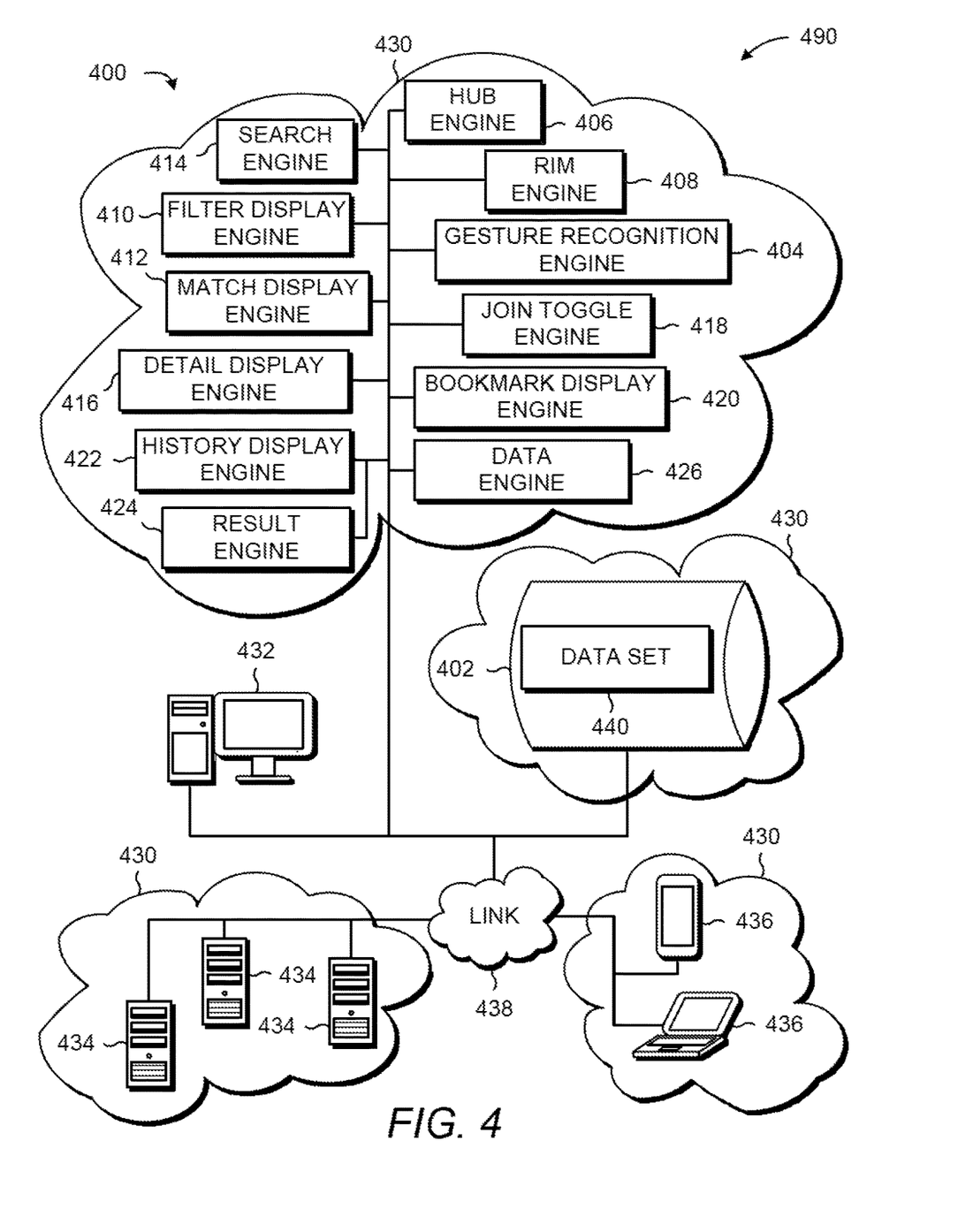
FIG. 4 depicts an example environment in which various data exploration systems can be implemented.

Environment:

FIG. 4 depicts example environments in which various example data exploration systems 400 can be implemented. The example environment 490 is shown to include an example data exploration system 400 for causing display of a subset of objects of a data set. The system 400 (described herein with respect to FIGS. 2 and 3) can represent generally any circuitry or combination of circuitry and executable instructions to explore a data set. The system 400 can include a gesture recognition engine 404, a hub engine 406, a rim engine 408, a filter display engine 410, a match display engine 412, a search engine 414, a detail display engine 416, a join toggle engine 418, a bookmark display engine 420, a history display engine 422, and a result engine 424 that are the same as the gesture recognition engine 204, the hub engine 206, the rim engine 208, the filter display engine 210, the match display engine 212, the search engine 214, the detail display engine 216, the join toggle engine 218, the bookmark display engine 220, the history display engine 222, and the result engine 224 of FIG. 2, respectively, and the associated descriptions are not repeated for brevity. The example system 400 can also include a data engine 426 representing any circuitry or combination of circuitry and executable instructions to communicate with a data management system that maintains the data set 440, such as a data set 440 of a data store 402 residing in a memory resource of a service device 434. As shown in FIG. 4, the engines 404-426 can be integrated into a compute, such as a service device. The engines 404-426 can be integrated via circuitry or as installed instructions into a memory resource of the compute.

The example environment 490 can include compute devices, such as developer devices 432, service devices 434, and user devices 436. A first set of instructions can be developed and/or modified on a developer device 432 and associated with a data set 440 of objects. For example, an application can be developed and modified on a developer device 432 and stored onto a web server, such as a service device 434, and the data set 440 associated with the application can be stored in a data store 402 on a data server, such as a service device 434. The service devices 434 represent generally any compute devices to respond to a network request received from a user device 436, whether virtual or real. For example, the service device 434 can operate a combination of circuitry and executable instructions to provide a network packet in response to a request for a page or functionality of an application. The user devices 436 represent generally any compute devices to communicate a network request and receive and/or process the corresponding responses. For example, a browser application may be installed on the user device 436 to receive the network packet from the service device 434 and utilize the payload of the packet to display an element of a page via the browser application.

The compute devices can be located on separate networks 430 or part of the same network 430. The example environment 490 can include any appropriate number of networks 430 and any number of the networks 430 can include a cloud compute environment. A cloud compute environment may include a virtual shared pool of compute resources. For example, networks 430 can be distributed networks comprising virtual computing resources. Any appropriate combination of the system 400 and compute devices can be a virtual instance of a resource of a virtual shared pool of resources. The engines and/or modules of the system 400 herein can reside and/or execute "on the cloud" (e.g. reside and/or execute on a virtual shared pool of resources).

A link 438 generally represents one or a combination of a cable, wireless connection, fiber optic connection, or remote connections via a telecommunications link, an infrared link, a radio frequency link, or any other connectors of systems that provide electronic communication. The link 438 can include, at least in part, intranet, the Internet, or a combination of both. The link 438 can also include intermediate proxies, routers, switches, load balancers, and the like.

Referring to FIGS. 2-4, the engines 204-224 of FIG. 2 and/or the modules 304-324 of FIG. 3 can be distributed across devices 432, 434, 436, or a combination thereof. The engines and/or modules can complete or assist completion of operations performed in describing another engine and/or module. For example, the rim engine 408 of FIG. 4 can request, complete, or perform the methods or operations described with the rim engine 208 of FIG. 2 as well as the filter display engine 210, the match display engine 212, the detail display engine 216, and the result engine 224 of FIG. 2. Thus, although the various engines and modules are shown as separate engines in FIGS. 2 and 3, in other implementations, the functionality of multiple engines and/or modules may be implemented as a single engine and/or module or divided in a variety of engines and/or modules. In some example, the engines of the system 400 can perform example methods described in connection with FIGS. 5-8.

OPERATION: FIG. 5 depicts example modules used to implement example data exploration systems. Referring to FIG. 5, the example modules of FIG. 5 generally include a gesture recognition module 504, a filter input module 540, a display module 542, and a result module 512. The example modules of FIG. 5 can be implemented on a compute device, such as a service device 434.

A gesture input 552 can be received by the gesture recognition module 504. In general, the gesture recognition module 504 represents program instructions that when executed cause a processor resource to compare the gesture input 552 to a list of gestures 554 enabled by the data exploration system. The gesture recognition module 504 can include program instructions, such as a class module 544 and a location module 546, to assist identification of a gesture and an action to perform based on the identified gesture. For example, the class module 544 can represent program instructions that when executed cause a processor resource to identify the class of the gesture (i.e., the gesture type) based on the gesture input and the location module 546 can represent program instructions that when executed cause a processor resource to identify the location of the gesture, where the gesture class and gesture location can determine the UI element (e.g., an object, a tag, or a window of the UI) and the action to perform on the UI element.

The graphical UI ("GUI") input module 540 represents program instructions that when executed cause a processor resource to receive input from the user. In particular, the GUI input module 540 can include program instructions, such as a search module 514 and a join toggle module 518, to receive input from the user to determine the scope of the subset of the objects of the data set that are to be visible in the results window. For example, the search module 514 can represent program instructions that when executed cause a processor resource to receive text 556 from the user via a search box UI element and use the text 566 to determine a focal object of the data set. For another example, the join toggle module 518 can represent program instructions that when executed cause a processor resource to identify whether a plurality of tags of the filter are to be joined to form an intersection of object groups or a union of object groups based on the selection 558 from the user (e.g., based on a selection of "AND" or "OR").

After receiving the gesture information and other user input, the result set of filtering the data set based on the focal object and the filter can be caused to be presented (e.g., displayed on a monitor) to allow the result set to be explored. The display module 542 represents program instructions that when executed cause a processor resource to cause the UI to display based on a state of the data exploration session as determined by gestures, user input, data state information, and/or system state information. The display module 542 can include program instructions, such as the hub module 506, rim module 508, the filter display module 510, the match display module 512, the bookmark display module 520, the history display module 522, and the detail display module 516. The processor resource executing the display module 542 can utilize the information associated with the data exploration session. For example, the information utilized by a processor resource executing the display module 542 can include load data 560, exploration data 562, and UI data 564 to accurately cause a portion of the data set to display and allow the data set to be explored. The load data 560 represents the objects loaded for display based on the focal object and the filter (such as data provided from the data engine 426 of FIG. 4). The exploration data 562 represents the gesture information regarding how the data is being interacted with by the user (e.g., information provided with the gesture input). The UI data 564 represents the data associated with how the data is presented to the user, such as the focal object history, object locations, and the saved tag list.

The results module 512 can include program instructions, such a result size module 548 and a result position module 550 to cause reference points for where the user is located while exploring the data. For example, the result size module 548 can represent program instructions that when executed cause a processor resource to cause a number of the objects of the data set available to be presented on the user interface (e.g., the total number of objects loaded based on the load data 560). For another example, the result position module 550 can represent program instructions that when executed cause a processor resource to cause the position of the current subset within the result set to be display (e.g., the position of the visible objects in the total number of objects loaded for potential view as provided in the load data 560). The modules 504-524 can be the same as the respective modules 304-324 of FIG. 3 and their descriptions have not been repeated in their entirety. The UI can be displayed with the updated data exploration session information based on the output 566.

Figure 6:
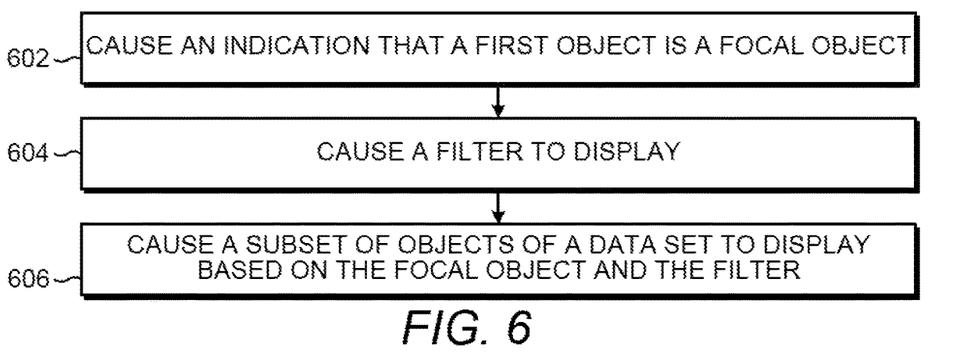
FIGS. 6 and 7 are flow diagrams depicting example methods for causing display of a subset of objects of a data set.
Figure 7:
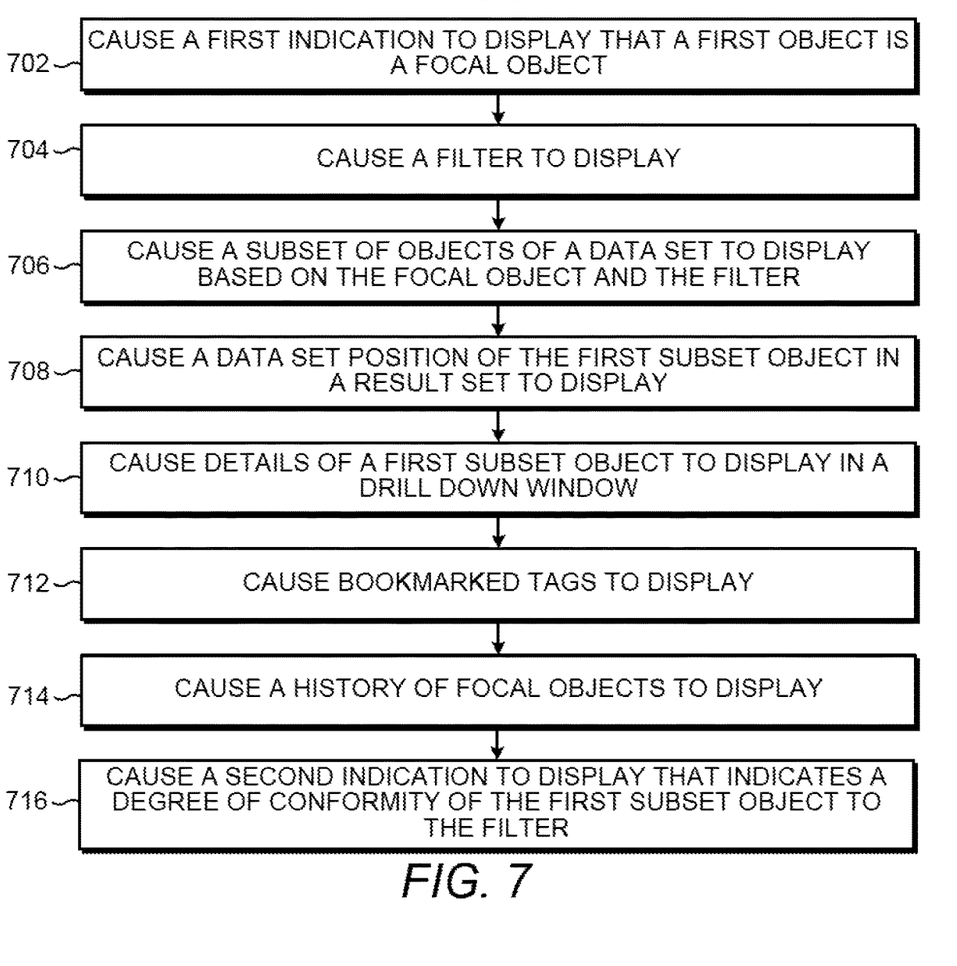

FIGS. 6 and 7 are flow diagrams depicting example methods for causing display of a subset of objects of a data set. Referring to FIG. 6, example methods for causing display of a subset of objects of a data set can generally comprise causing an indication that an object is a focal object at a first UI area, causing a second UI area to display a filter, and causing a third UI area to display a subset of objects of the data set based on the focal object and the filter.

At block 602, a first indication that a first object is a focal object is caused to display. For example, the indication can be a visual indication at a first UI area (such as the focal object location 122 of FIG. 1) that a first object is a focal object based on a first gesture related to the first object (such as a double-tap or a drag-and-drop of the object to the first UI area). A first subset object (i.e., one of the visible objects in the window 132 of FIG. 1) can be caused to become the focal object when an appropriate gesture is made, such as when the first subset object is drag-and-dropped into the first UI area or when the first subset object is selected by a double-tapped gesture. The first visual indication can be any appropriate form of visual representation to display the appointment of an object as the focal object. Example visual representations may be a change in location of the object, a change in size of the object, a change in color of the object, a change in font type of the object, an addition or change of an image or text (such as a number, string, or other label), etc.

At block 604, a filter is caused to be displayed. For example, a second UI area can display a list of tags (which represent the filter applied to the data set) which represent relationships among objects of the data set.

At block 606, a subset of objects of the data set are caused to be displayed. The subset can be displayed in a third UI area (such as a window 132 or an area otherwise along a reference arc 114 of FIG. 1) and should correlate to the objects related to the focal object and the filter. The third UI area can be a curved section to designate a location to display the subset of objects. The curved nature of the third UI area can provide an intuitive interface to suggest interaction with the data using appropriate gestures, such as a rotation over the third UI area, to change the subset (e.g., move the visible set of data objects to include previously hidden objects and hide previously seen objects).

FIG. 7 includes blocks similar to blocks of FIG. 6 and provides additional blocks and details. In particular, FIG. 6 depicts additional blocks and details generally regarding causing the results information to be displayed, causing object details to be displayed, causing bookmarked tags to display, causing a focal object history to display, and causing degrees of conformity to the filter to display. Blocks 702, 704, and 706 are the same as blocks 602, 604, and 606 of FIG. 6 and, for brevity, their respective descriptions are not been repeated.

At block 708, a data set position of the first subset object in the result set is caused to be displayed. The result set is the subset of loaded objects determined based on the focal object and the filter. The data set position can reference the total number of objects in the result set to alert the user as to where the user is located while exploring the result set.

At block 710, details of a first subset object (e.g., an object of the subset of objects visible in the third UI area) are caused to be displayed in a drill down window associated with the first subset object. For example, a drill down window may appear with the tags of the first subset object when the first subset object reaches a particular location (e.g., a particular position in the window 132 of FIG. 1) on the UI or when the first subset object is interacted with an appropriate gesture.

To assist the user to retrieve prior results or otherwise move to a previous state in the data exploration session, bookmarked tags are caused to be displayed at a fourth UI area at block 712 and a history of focal objects are caused to be displayed at a fifth UI area at block 714. The fourth UI area and fifth UI area can be areas separated from the third UI area, such as in the example areas 104, 110, and 112 of FIG. 1.

At block 716, a second visual indication is caused to be displayed with reference to a first object, such as a visible subset object. The second visual indication is to indicate a degree of conformity of the first object to the filter. The second visual indication can be any appropriate form of visual representation to display the degree of conformity of an object. For example, the degree of conformity of the objects 120 in FIG. 1 is depicted as a highlighted circumference 128 of the objects 120 where the percentage of the circumference that is highlighted is associated with the degree of conformity to the filter. Other example visual representations may be a change in location of the object, a change in size of the object, a change in color of the object, a change in font type of the object, an addition or change of an image or text (such as a number, string, or other label), etc.

Figure 8A:
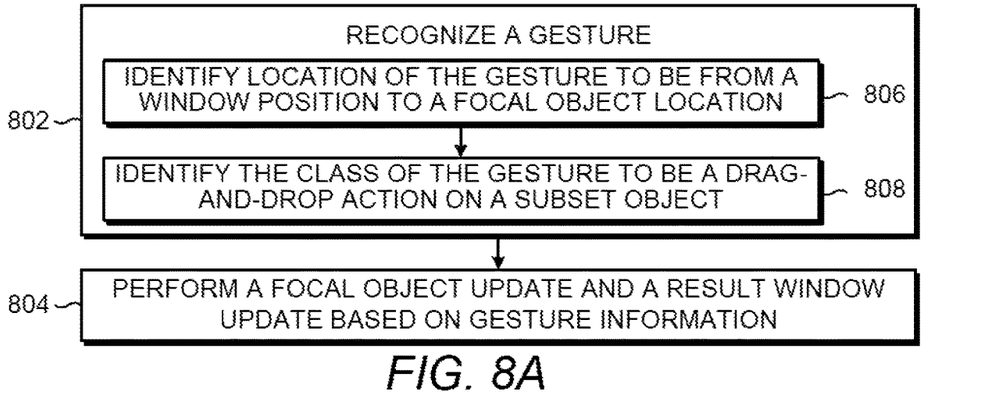
FIGS. 8A-8C are flow diagrams depicting example gestures and action performed based on the example gestures.
Figure 8B:
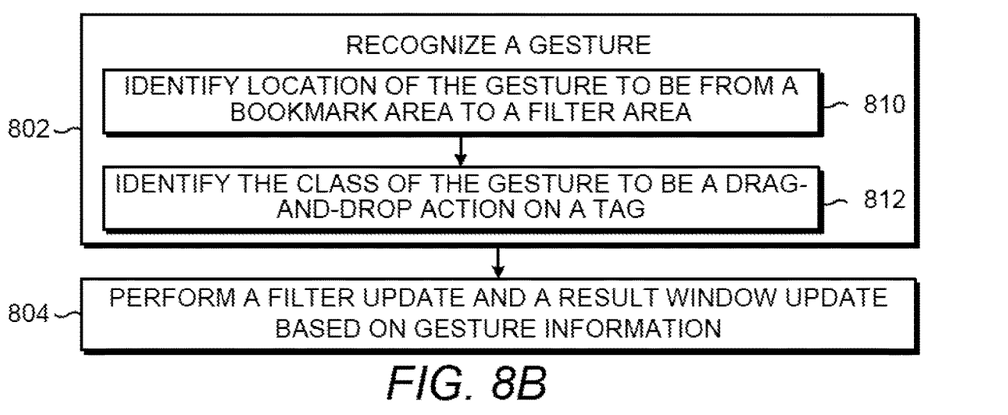
Figure 8C:
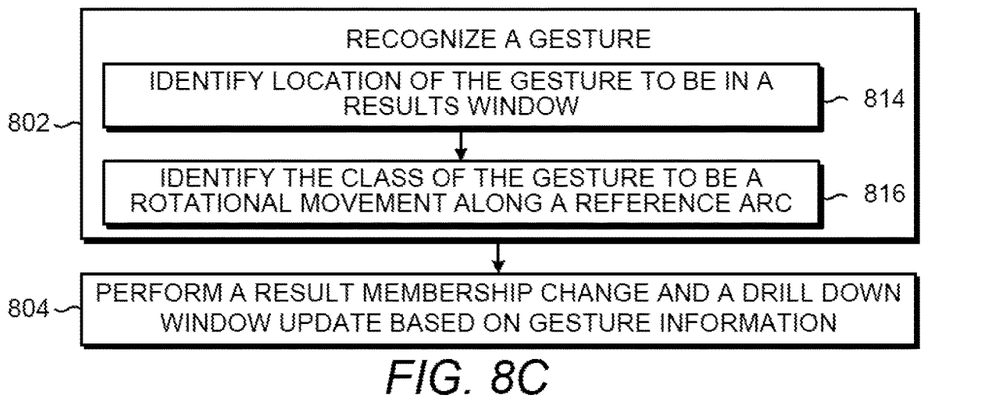

FIGS. 8A-8C are flow diagrams depicting example gestures and action performed based on the example gestures. In general, blocks 802 of FIGS. 8A-8C are directed to recognizing a gesture and blocks 804 of FIGS. 8A-8C are directed to performing a particular action based on the gesture identified at blocks 802.

For example, referring to FIG. 8A, a gesture is recognized at block 802 by identifying the location of the gesture to be from a window position to a focal object location at block 806 and identifying the class of the gesture to be a drag-and-drop action on a subset object at block 808. In the example of FIG. 8A, the gesture is recognized as appointing the subset object as the focal object and a focal object update and a result window update are performed at block 804 based on the gesture information (i.e., the location of the gesture and the class of the gesture). A focal object update represents changing the focal object to a newly appointed object and updating the focal object history. A result window update represents refreshing the loaded objects and/or the visible set of objects in the result window.

For another example, referring to FIG. 8B, a gesture is recognized at block 802 by identifying the location of the gesture from a bookmark area to a filter area at block 810 and identifying the class of the gesture to be a drag-and-drop action on a tag at block 812. In the example of FIG. 8B, the gesture is recognized as adding the tag to the filter and a filter update and a results window update are performed at block 804 based on the gesture information. A filter update represents changing the filter to include objects with the newly added tag and changing the tags displayed in the second UI area to include the newly added tag.

For yet another example, referring to FIG. 8C, a gesture is recognized at block 802 by identifying the location of the gesture to be in a result window at block 814 and identifying the class of the gesture to be a rotational movement along a reference arc at block 816. In the example of FIG. 8C, the gesture is recognized as a traversal of the data set and a result membership change and a drill down window update are performed at block 804 based on the gesture information. A result membership change represents a change in the visible subset of objects in the window, such as the removal of an object at a position in the window in the direction of the gesture movement and the addition of an object at a position in the window away from the direction of the gesture movement. In general, the result membership change represents any performance of viewing a different portion of the set of objects loaded based on the focal object and the filter. A drill down window update represents a change to the list of details (e.g., the list of tags of an object) when a new object is selected to provide details. In the above example, the rotational movement can indicate that a different object can become positioned at the designated detail location and thus, the details of the newly position object may be caused to be presented. In this manner, data objects can be explored and their relationships with other objects can be discovered and utilized for further exploration, such as by applying tags of a discovered object to the filter.

CONCLUSION

Although the flow diagrams of FIGS. 5-7 and 8A-8C illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A data exploration system comprising:
   a processor; and
   a storage medium including instructions executable by the processor to:
   identify gestures performed on a user interface;
   display a first set of graphical objects in a portion of the user interface, wherein a focal location is located in a center of the portion;
   in response to a detection of a first gesture that represents movement of a selected graphical object from the portion to the focal location:
   display the selected graphical object only in the focal location; and
   update the portion of the user interface to display a second set of graphical objects, wherein the second set of graphical objects is selected based at least in part on the selected graphical object; and
   display, on the user interface, a plurality of tags associated with a second graphical object only when the second graphical object resides in a first location of the portion of the user interface.

2. The system of claim 1, comprising instructions executable by the processor to:
   display, on the user interface, a value indicating a total quantity of graphical objects of a data set available to be presented on the user interface; and
   display, on the user interface, a value indicating a position of the second set of graphical objects in the data set.

3. The system of claim 1, comprising instructions executable by the processor to:
   display, on the user interface, a first tag for filtering the second set of graphical objects to load in the portion; and
   display of a visual indicator of a degree of conformity of each of the second set of graphical objects to the first tag.

4. The system of claim 3, comprising instructions executable by the processor to:
   filter the second set of graphical objects using one of:
   a union of the first tag and a second tag; and
   an intersection of the first tag and the second tag.

5. The system of claim 1, comprising instructions executable by the processor to:
   display a historical log of graphical objects that have been presented in the focal location.

6. The system of claim 1, comprising instructions executable by the processor to:
   select the second set of graphical objects based on the selected graphical object in the focal location and a filter comprising one or more tags.

7. A non-transitory computer readable storage medium comprising a set of instructions executable by a processor resource to:
   cause a first set of graphical objects to be displayed in a portion of a user interface area, wherein a focal location is located in a center of the user interface area;
   in response to a detection of a first gesture that represents movement of a selected graphical object from the user interface area to the focal location:
   cause the selected graphical object to be displayed only in the focal location; and
   cause the user interface area to display a second set of graphical objects, wherein the second set of graphical objects is selected based at least in part on the selected graphical object; and
   cause a plurality of tags associated with a second graphical object to display in a detail user interface area of the user interface area only when the second graphical object is located in a particular position within the user interface area.

8. The medium of claim 7, wherein the set of instructions is executable by the processor resource to:
   cause a history of graphical objects that have been presented in the focal location to display on the user interface area; and
   cause a first tag to display in a bookmark user interface area.

9. The medium of claim 8, wherein the set of instructions is executable by the processor resource to:
   cause the first tag from the bookmark user interface area to be added to a filter based on a second gesture; and cause the second set of graphical objects to change based on a rotational gesture associated with the user interface area.

10. The medium of claim 9, wherein the set of instructions is executable by the processor resource to:
select the second set of graphical objects displayed in the user interface area based at least in part on the first tag added to the filter; and
cause a visual indicator to display with reference to the second set of graphical objects, the visual indicator to indicate a degree of conformity of the second set of graphical objects to the filter.

11. The medium of claim 9, wherein the set of instructions is executable by the processor resource to:
display a value indicating a total quantity of objects that match the first tag and the selected graphical object.

12. The medium of claim 7, wherein the set of instructions is executable by the processor resource to:
select the second set of graphical objects based on the selected graphical object in the focal location and a filter comprising one or more tags.

13. A method comprising:
displaying a first set of graphical objects in a portion of a user interface, wherein a focal location is located in a center of the portion;
detecting a first gesture to move a selected graphical object from the portion to the focal location;
in response to the first gesture to move the selected graphical object from the portion to the focal location:
displaying the selected graphical object only in the focal location;
selecting a second set of graphical objects based at least in part on the selected graphical object; and
updating the portion of the user interface to display the second set of graphical objects; and
displaying, on the user interface, a plurality of tags associated with a second graphical object in response to the second graphical object being located in a particular location of the portion of the user interface.

14. The method of claim 13, comprising:
causing a second visual indication to display with reference to the second graphical object, the second visual indication to indicate a degree of conformity of the second graphical object to a filter tag; and
displaying a value indicating a data set position of the second graphical object in a result set based on the selected graphical object.

15. The method of claim 13, comprising:
displaying bookmarked tags in the user interface; and
displaying a history of graphical objects that have been presented in the focal location.

16. The method of claim 13, wherein:
the first gesture comprises the selected graphical object being drag-and-dropped into the focal location.

17. The method of claim 13, comprising:
selecting the second set of graphical objects based on the selected graphical object in the focal location and a filter comprising one or more tags.

18. The method of claim 17, wherein the second set of graphical objects is a subset of a data set that matches the selected graphical object and the filter, and wherein the subset of the data set that is displayed in the portion is changed by a rotational gesture made on the portion.

19. The method of claim 17, wherein the one or more tags of the filter are moved into a filter area of the user interface.

* * * * *